United States Patent
Miki et al.

(10) Patent No.: US 8,549,956 B2
(45) Date of Patent: Oct. 8, 2013

(54) BICYCLE CONTROL DEVICE

(75) Inventors: Yoshimitsu Miki, Osaka (JP); Hisayuki Sato, Osaka (JP); Etsuyoshi Watarai, Osaka (JP); Akira Tsumiyama, Osaka (JP)

(73) Assignee: Shimano Inc., Osaka (JP)

( * ) Notice: Subject to any disclaimer, the term of this patent is extended or adjusted under 35 U.S.C. 154(b) by 528 days.

(21) Appl. No.: 11/767,839

(22) Filed: Jun. 25, 2007

(65) Prior Publication Data
US 2008/0314191 A1 Dec. 25, 2008

(51) Int. Cl.
*B62M 25/04* (2006.01)

(52) U.S. Cl.
USPC ............................................ 74/502.2

(58) Field of Classification Search
USPC .................. 74/489, 502.2, 491, 501.5, 501.6, 74/523, 525, 473.13, 473.14
See application file for complete search history.

(56) References Cited

U.S. PATENT DOCUMENTS

| | | | | |
|---|---|---|---|---|
| 3,481,217 A | * | 12/1969 | Maeda | 74/489 |
| 3,595,351 A | * | 7/1971 | Ishida | 192/217 |
| 3,921,955 A | * | 11/1975 | Haddad, Jr. | 251/297 |
| 4,189,954 A | * | 2/1980 | Nakamura et al. | 74/488 |
| 4,232,564 A | * | 11/1980 | Yamasaki | 74/473.13 |
| 4,304,146 A | | 12/1981 | Ueda | |
| 4,318,307 A | * | 3/1982 | Kine | 74/489 |
| 4,348,916 A | * | 9/1982 | Shimano | 74/489 |
| 4,532,825 A | | 8/1985 | Nagano | |
| 4,779,482 A | * | 10/1988 | Kawaguchi | 74/523 |
| 4,995,280 A | | 2/1991 | Tagawa | |
| 5,094,120 A | | 3/1992 | Tagawa | |
| 5,241,878 A | * | 9/1993 | Nagano | 74/502.2 |
| 5,257,683 A | | 11/1993 | Romano | |
| 5,400,675 A | | 3/1995 | Nagano | |
| 6,155,132 A | | 12/2000 | Yamane | |
| 6,810,764 B2 | | 11/2004 | Chen | |
| 6,957,597 B2 | * | 10/2005 | Irie et al. | 74/502.2 |
| 7,194,928 B2 | | 3/2007 | Kawakami | |
| 2006/0207375 A1 | * | 9/2006 | Jordan et al. | 74/489 |
| 2007/0137388 A1 | * | 6/2007 | Dal Pra | 74/502.2 |
| 2008/0098848 A1 | | 5/2008 | Dal Pra' et al. | |
| 2008/0229863 A1 | | 9/2008 | Orrico et al. | |

FOREIGN PATENT DOCUMENTS

| | | |
|---|---|---|
| EP | 1 342 655 A2 | 9/2003 |
| EP | 1 449 756 A1 | 8/2004 |
| GB | 1134807 | 11/1968 |
| JP | 01134591 U * | 9/1989 |
| JP | 3283289 B2 | 3/2002 |

OTHER PUBLICATIONS

Communication of a Notice of Opposition of corresponding EP Application No. 08 001 054.9 dated Jun. 24, 2011.

* cited by examiner

*Primary Examiner* — Thomas Diaz
(74) *Attorney, Agent, or Firm* — Global IP Counselors

(57) ABSTRACT

A bicycle control device is basically provided with a base member, a shift control unit, a brake lever, a shift operating lever and a lever adjustment mechanism. The shift control unit is mounted to the base member. The brake lever is movably mounted relative to the base member. The shift operating lever is operatively coupled to the shift control unit to operate the shift control unit when the shift operating lever is moved from a rest position along a shift operating path. The shift operating lever is movable from the rest position along a non-shift movement path independently of the brake lever. The lever adjustment mechanism is operatively coupled to the shift operating lever to change a location of the rest position of the shift operating lever along the non-shift movement path.

15 Claims, 13 Drawing Sheets

BICYCLE CONTROL DEVICE

BACKGROUND OF THE INVENTION

1. Field of the Invention

This invention generally relates to a bicycle control device for operating a bicycle component. More specifically, the present invention relates to a bicycle control device that has a shift operating member with an adjustable rest position.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for performing shifting and braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmitted the operating force to the drive component of a bicycle shifting mechanism by a cable that was fixed at one end to the control lever. Currently, many different types of control devices exist for performing shifting and braking operations.

Sometimes the bicycle shifter and the bicycle brake lever are combined as a single integrated unit, while other times they are separate individual units. In the case of road bikes with drop type handlebars, the bicycle shifter and the bicycle brake lever are often combined as a single integrated control device. In some cases, a braking function and a shifting function is performed by a single dual function lever, One example of this type of control device is disclosed in U.S. Pat. No. 5,400,675 to Nagano (assigned to Shimano, Inc). More typically, one or two shift levers are provided in addition to the brake lever. One example of this type of control device is disclosed in U.S. Pat. No. 5,257,683 to Romano (assigned to Campagnolo). While these types of control devices work well, it is desirable to provide a bicycle control (component actuating) device that is relatively easily to manufacture and that is relatively easily for a rider to operate. Depending on how a rider grips the handlebar, an ideal distance between the shift lever and the handlebar may change. For example, in the case of the drop type handlebar, when the rider grips the handlebar below the brake/shift control device, it is typically desirable to have the rest position of the shifter lever closer to the handlebar than when the rider grips the brake/shift control device from above.

In view of the above, it will be apparent to those skilled in the art from this disclosure that there exists a need for an improved bicycle component actuating device. This invention addresses this need in the art as well as other needs, which will become apparent to those skilled in the art from this disclosure.

SUMMARY OF THE INVENTION

One object of the present invention is to provide a control (component actuating) device that has a shift operating member with an adjustable rest position.

The foregoing objects can basically be attained by providing a bicycle control device that basically comprises a base member, a shift control unit, a brake lever, a shift operating lever and a lever adjustment mechanism. The shift control unit is mounted to the base member. The brake lever is movably mounted relative to the base member. The shift operating lever is operatively coupled to the shift control unit to operate the shift control unit when the shift operating lever is moved from a rest position along a shift operating path. The shift operating lever is movable from the rest position along a non-shift movement path independently of the brake lever. The lever adjustment mechanism is operatively coupled to the shift operating lever to change a location of the rest position of the shift operating lever along the non-shift movement path.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
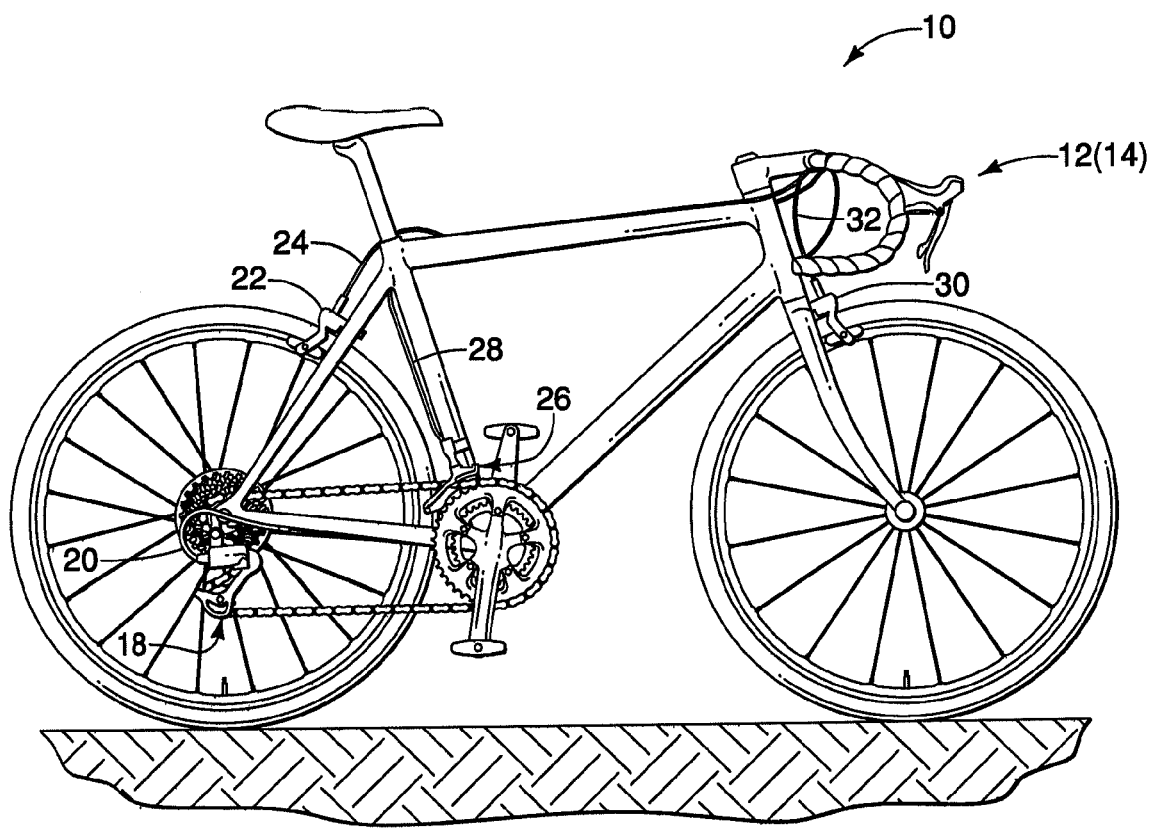
FIG. 1 is a side elevational view of bicycle equipped with a bicycle control (brake/shift) device coupled to a drop type handlebar in accordance with a preferred embodiment of the present invention.
Figure 2:
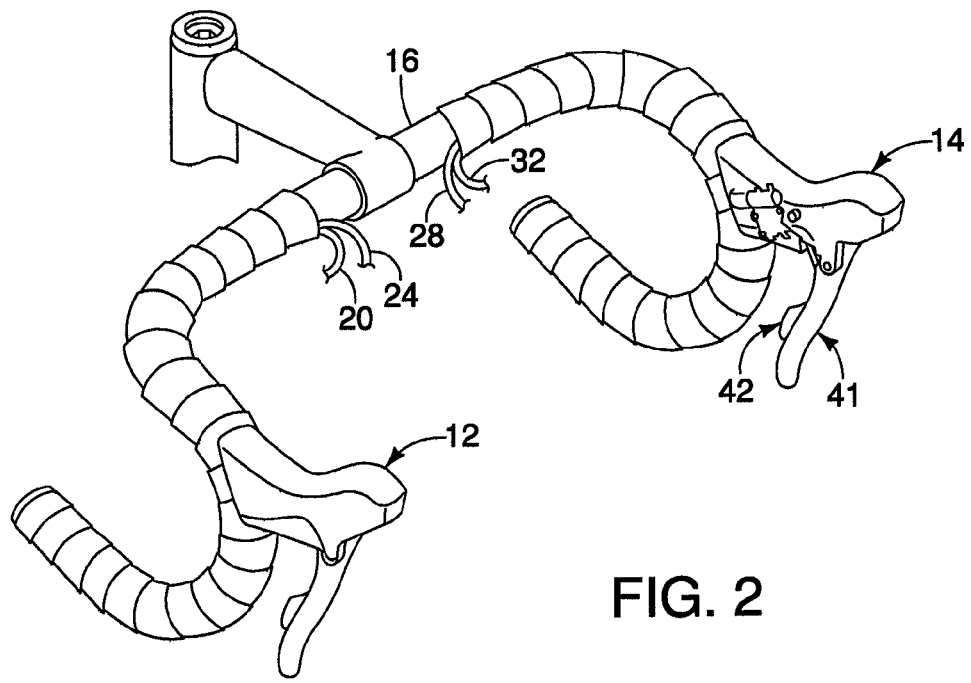
FIG. 2 is an enlarged partial perspective view of the drop type handlebar with the bicycle control (brake/shift) device in accordance with the illustrated embodiment of the present invention.

Referring initially to FIGS. 1 and 2, a bicycle 10 is illustrated in accordance with a pair of bicycle control devices 12 and 14 mounted on a bicycle handlebar 16 in accordance with one embodiment of the present invention. The bicycle control device 12 is a right hand side control device operated by the rider's right hand, while the bicycle control device 14 is a left hand side control device operated by the rider's left hand. In the illustrated embodiment, the bicycle control device 12 is operatively coupled to a rear derailleur 18 via a shift control cable 20 and a rear brake device 22 via a brake control cable 24. The bicycle control device 14 is operatively coupled to a front derailleur 26 via a shift control cable 28 and a front brake device 30 via a brake control cable 32. Alternatively, the bicycle control devices 12 and 14 can be switched so that the rider can operate the rear derailleur 18 and the front derailleur 26 with opposite hands and/or operate the rear and front brake devices 22 and 30 with opposite hands. In the illustrated embodiment, the left hand side bicycle control device 14 is substantially identical to the right hand side bicycle control device 12, except for the shifting unit (not shown) of the right hand side bicycle control device 12 has been modified to increase the number of gears that can be shifted. In any event, the right and left hand side bicycle control devices 12 and 14 are essentially identical in operation, except that they are mirror images of each other and the number of shift positions are different. Thus, only the left hand side bicycle control device 14 will be discussed and illustrated herein. Preferably, the cables 20, 24, 28 and 32 are conventional bicycle control cables that have an outer casing the covers an inner wire.

Referring now to FIGS. 3 to 10, left hand side bicycle control device 14 basically includes a base member 36, a shift control unit 38, a control (wire pulling) member 40, a first shift operating lever 41 and a second shift operating lever 42. The first shift operating lever 41 is a dual function operating lever that performs a braking operation in addition to a shifting operation. Thus, the bicycle control device 14 is configured and arranged to perform both a braking operation and a shifting operation as a single integrated unit that is mounted to the handlebar 16. In the illustrated embodiment, the first shift operating lever 41 is configured and arranged to perform a wire pulling operation and a braking operation, while the second shift operating lever 42 is configured and arranged to perform a wire releasing operation. The second shift operating lever 42 is located behind the first shift operating lever 41, when the first and second shift operating levers 41 and 42 are in rest positions. The first and second shift operating levers 41 and 42 are aligned in a non-shift movement plane or path BP of the first shift operating lever 41, when the first and second shift operating levers 41 and 42 are in rest positions.

The base member 36 includes a main body having a first end section 36a with a handlebar mounting structure 43 and a second end section 36b remotely disposed from the first end section 36a. The first and second shift operating levers 41 and 42 are located at the second end section 36b of the main body. The base member 36 is fixedly mounted to the handlebar 16 by the handlebar mounting structure 43, which defines a handlebar receiving area A with a central handlebar mounting axis B. The handlebar mounting structure 43 is preferably a conventional band clamp or similar structure.

Figure 3:
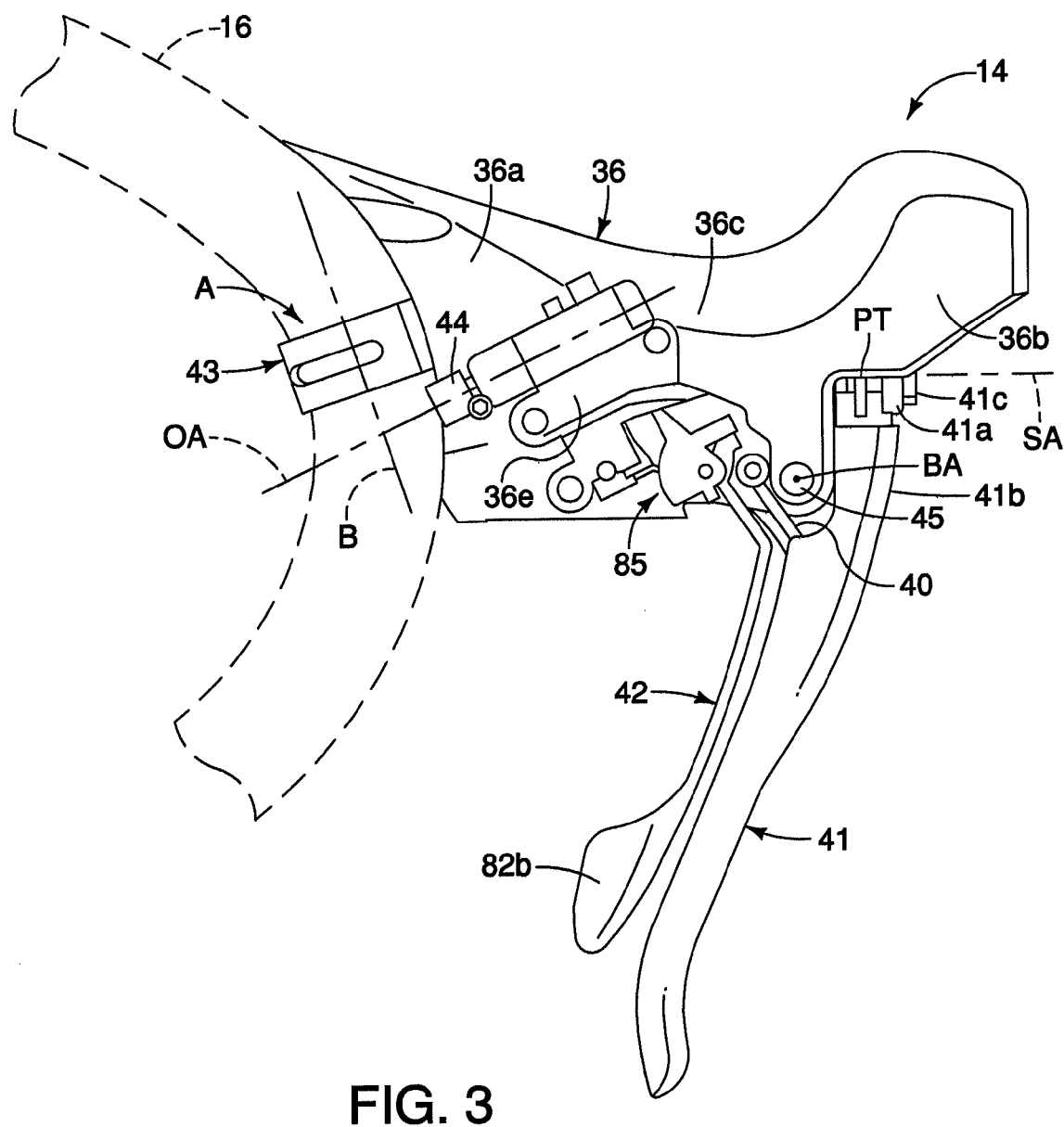
FIG. 3 is an inside elevational view of the left bicycle control (brake/shift) device with the first and second shift operating levers in the rest positions.
Figure 4:
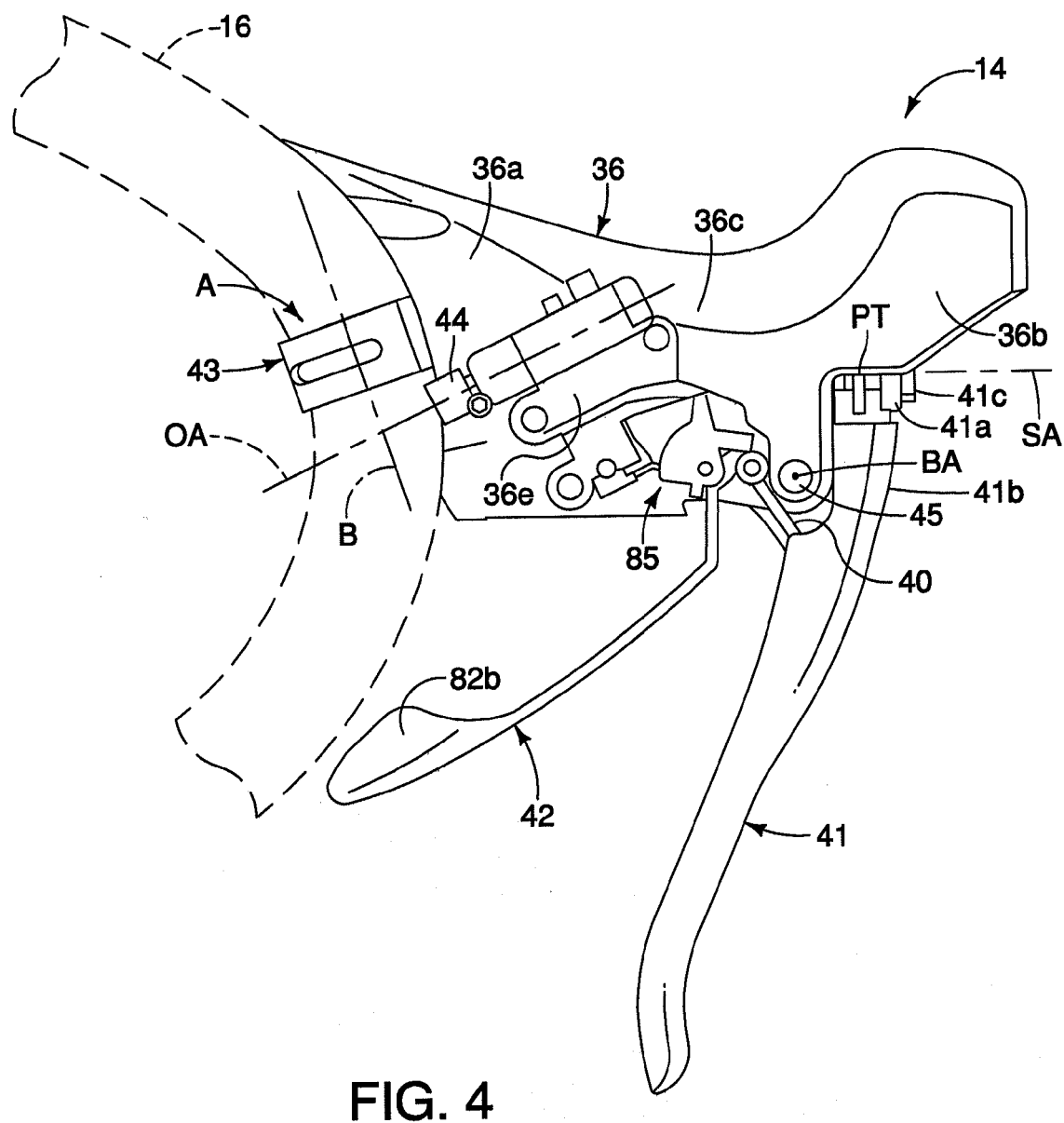
FIG. 4 is an inside elevational view, similar to FIG. 3, of the left bicycle control (brake/shift) device with the first and second shift operating levers in the rest positions, but with the second shift operating lever adjusted to a different rest position from the one shown in FIG. 3.
Figure 5:
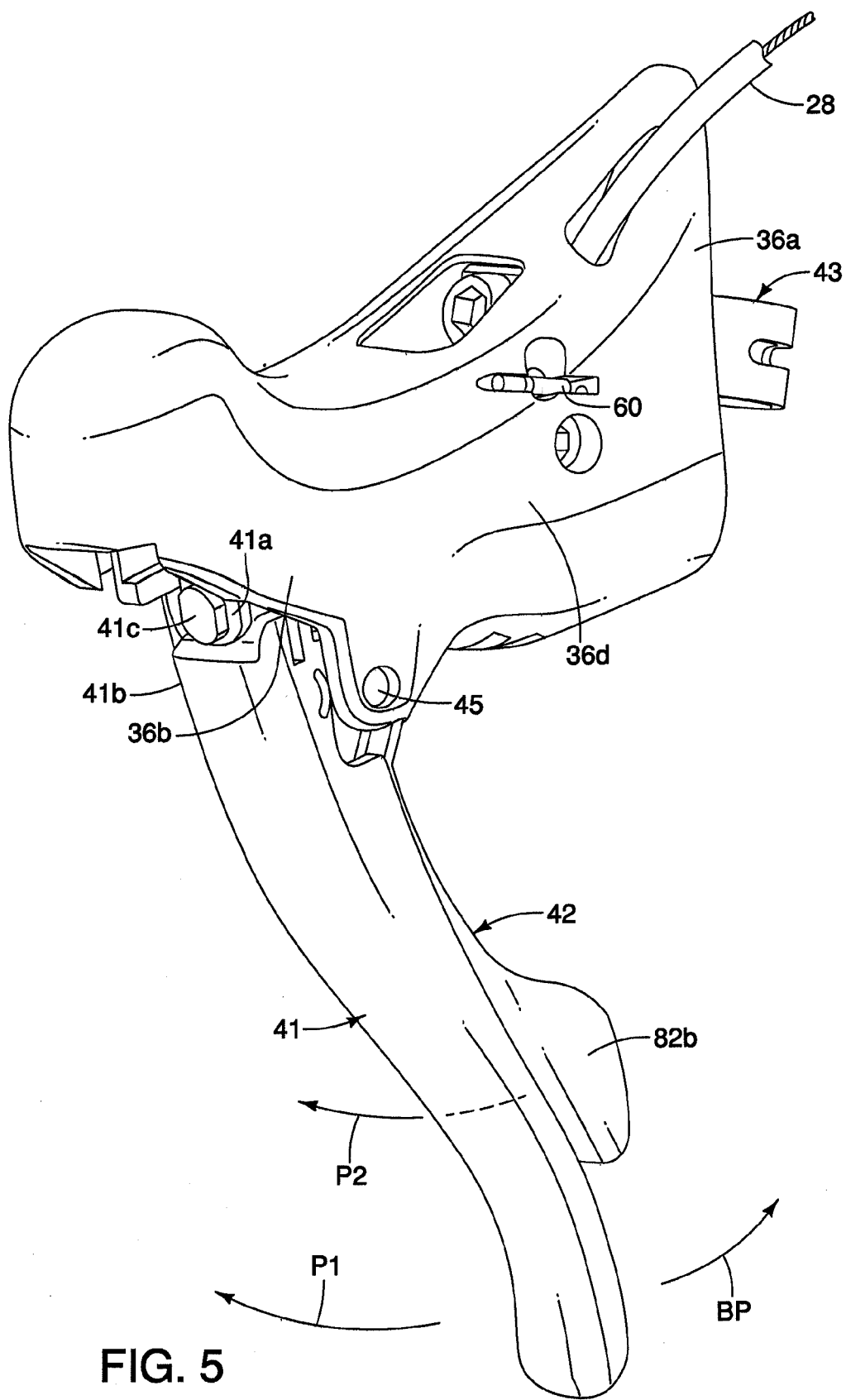
FIG. 5 is an outside perspective view of the left bicycle control (brake/shift) device with the first and second shift operating levers in the rest positions.

As seen in FIGS. 3 to 8 and 12, the main body of the base member 36 further includes an inner lateral side wall 36c and an outer lateral side wall 36d. The shift control unit 38 is mounted to the base member 36 generally between the lateral side walls 36c and 36d. The inner lateral side wall 36c has a bulging part that is shaped to accommodate a shift unit axle 44 of the shift control unit 38 as explained below. By having the shift unit axle 44 of the shift control unit 38 disposed closely adjacent the inner lateral side wall 36c, a large lever arm is formed in the shift control unit 38 to pull and release the inner wire of the shift control cable 28. As seen in FIGS. 3 and 4, the lateral side wall 36c of the base member 36 is provided with a removable panel 36e for installing and accessing the shift control unit 38 in the base member 36. This removable panel 36e forms a portion of the bulging part of the lateral side wall 36c.

Figure 10:
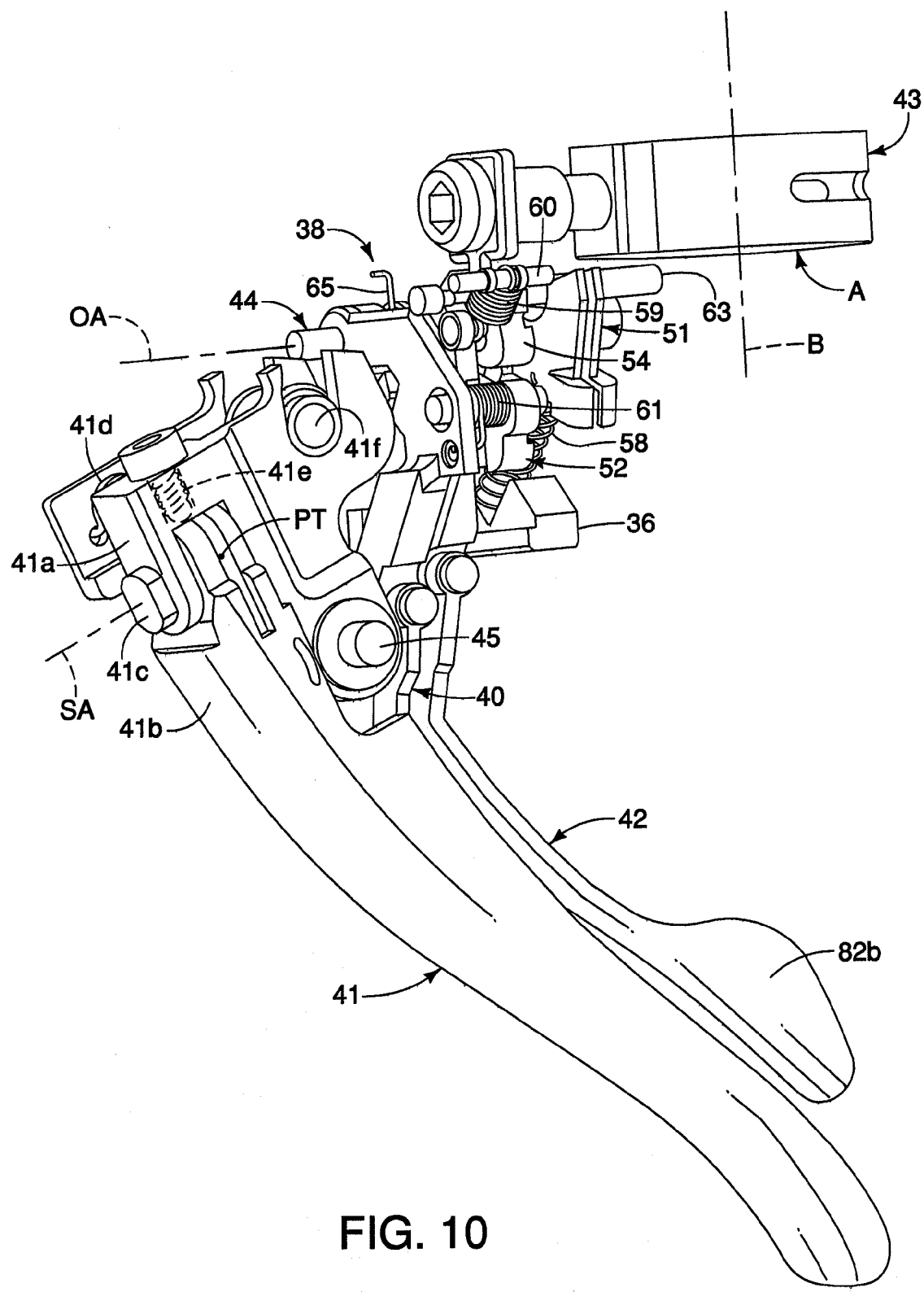
FIG. 10 is an enlarged partial outside perspective view of the left bicycle control (brake/shift) device with the base member removed to show the basic relationship of the shift control unit with the first and second shift operating levers.
Figure 11:
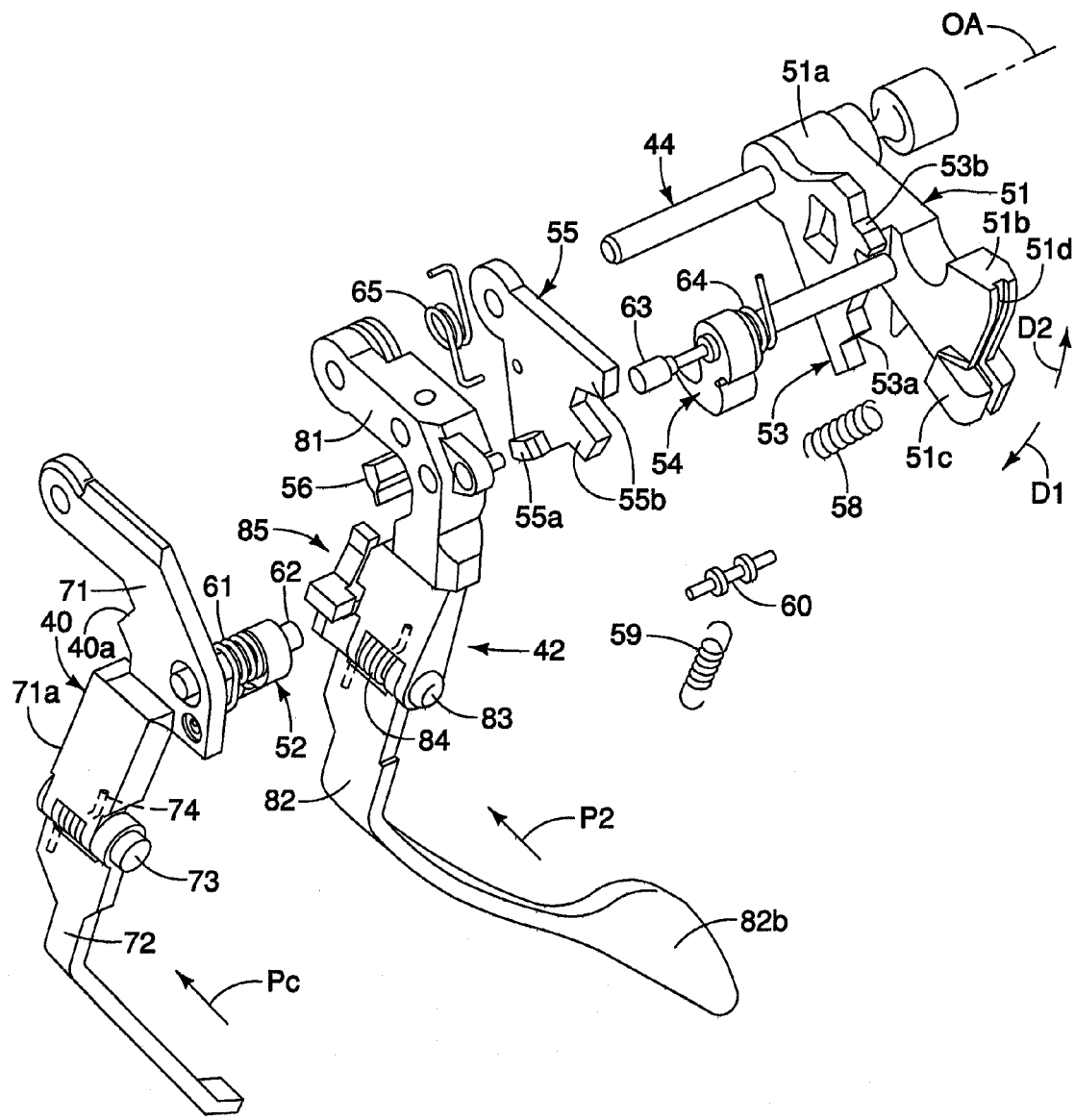
FIG. 11 is an exploded perspective view of selected parts of the shift control unit, the control member and the second shift operating lever.
Figures 12, 13:
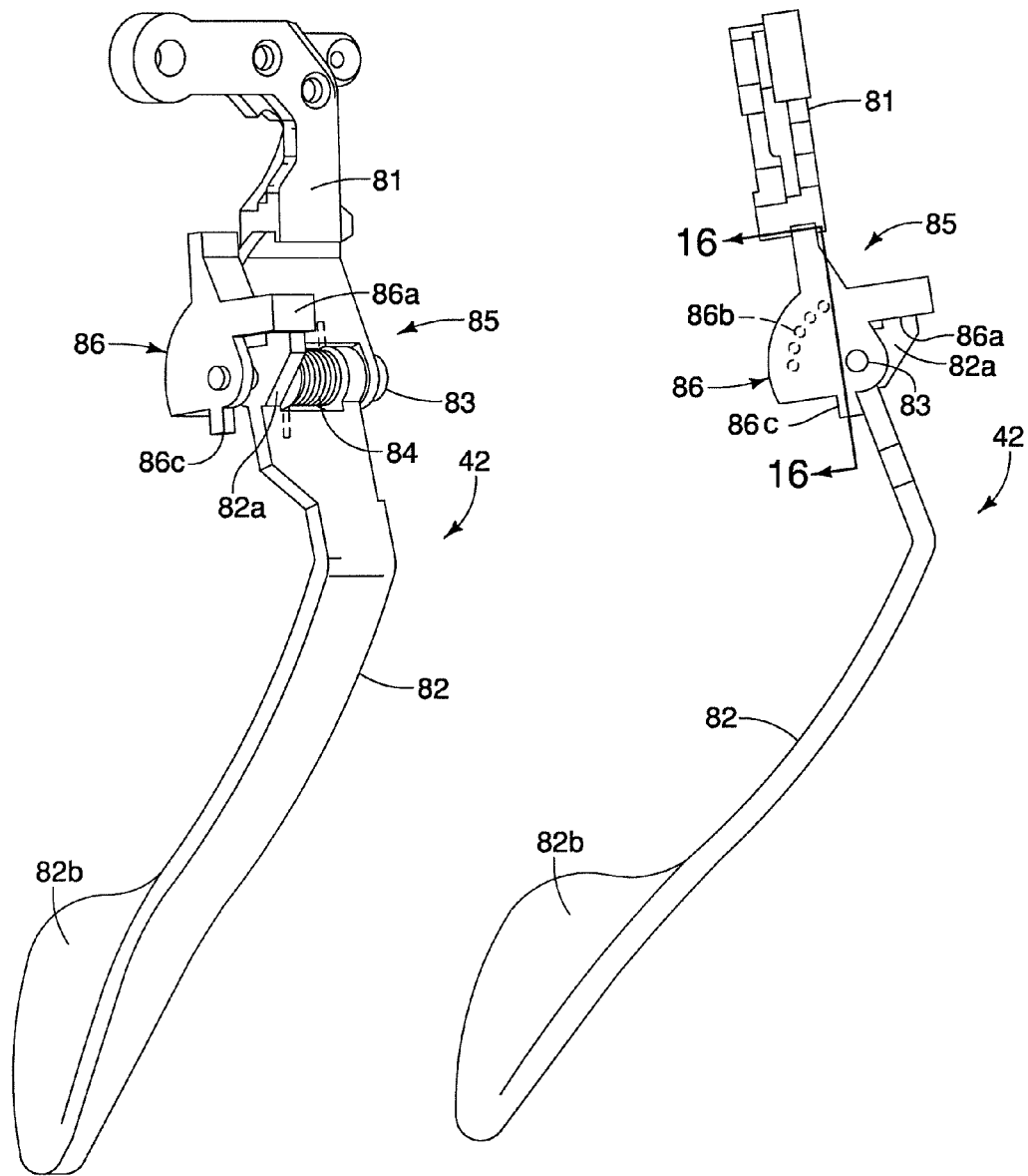
FIG. 12 is an inside perspective view of the second shift operating lever of the left bicycle control (brake/shift) device in the rest position in which the second shift operating lever would be the closest to the first shift operating lever.
FIG. 13 is an inside elevational view of the second shift operating lever of the left bicycle control (brake/shift) device in the rest position in which the second shift operating lever would be the closest to the first shift operating lever.
Figure 14:
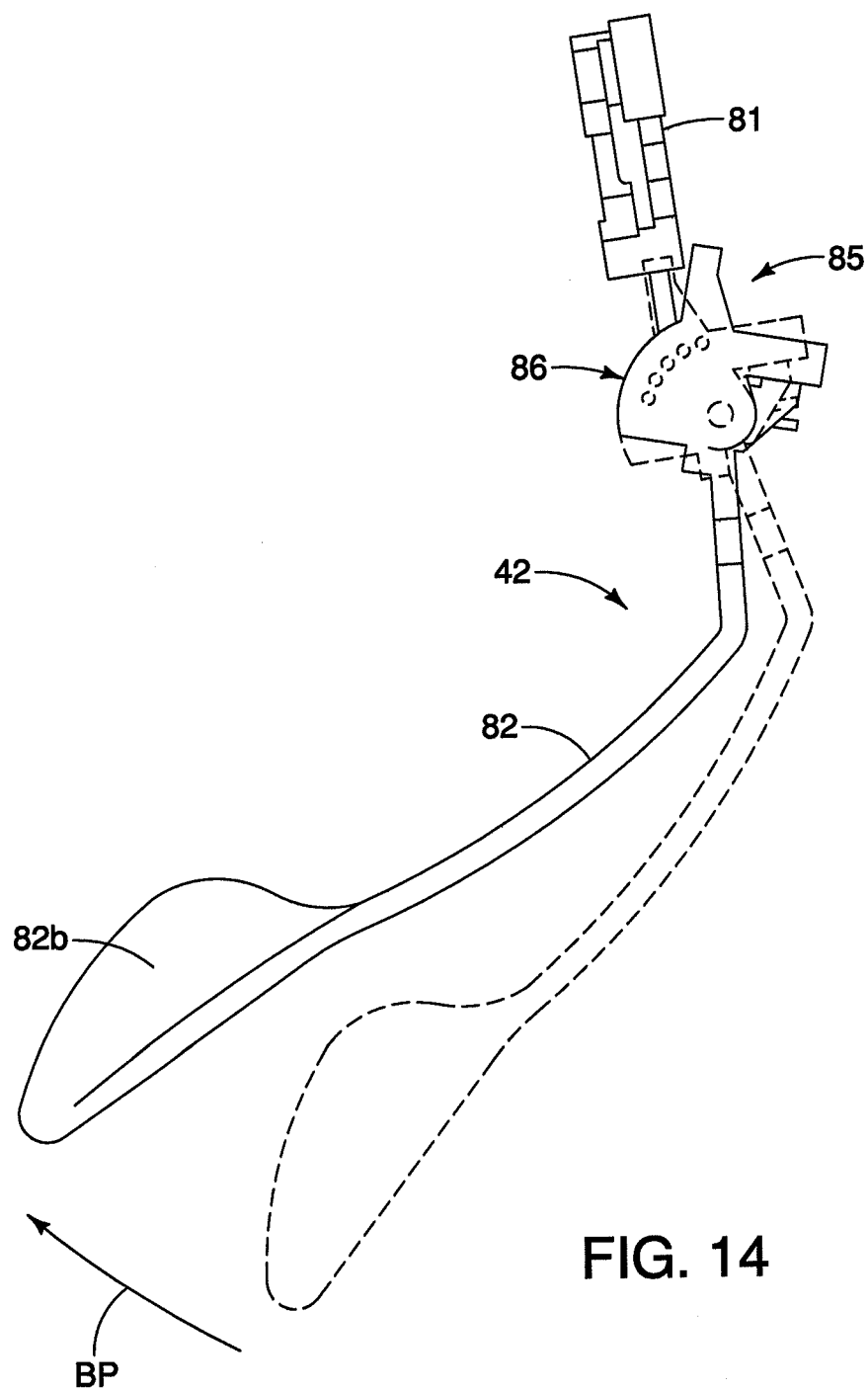
FIG. 14 is an inside elevational view of the second shift operating lever of the left bicycle control (brake/shift) device in an adjusted rest position with the rest position of FIG. 13 shown in broken lines.
Figure 15:
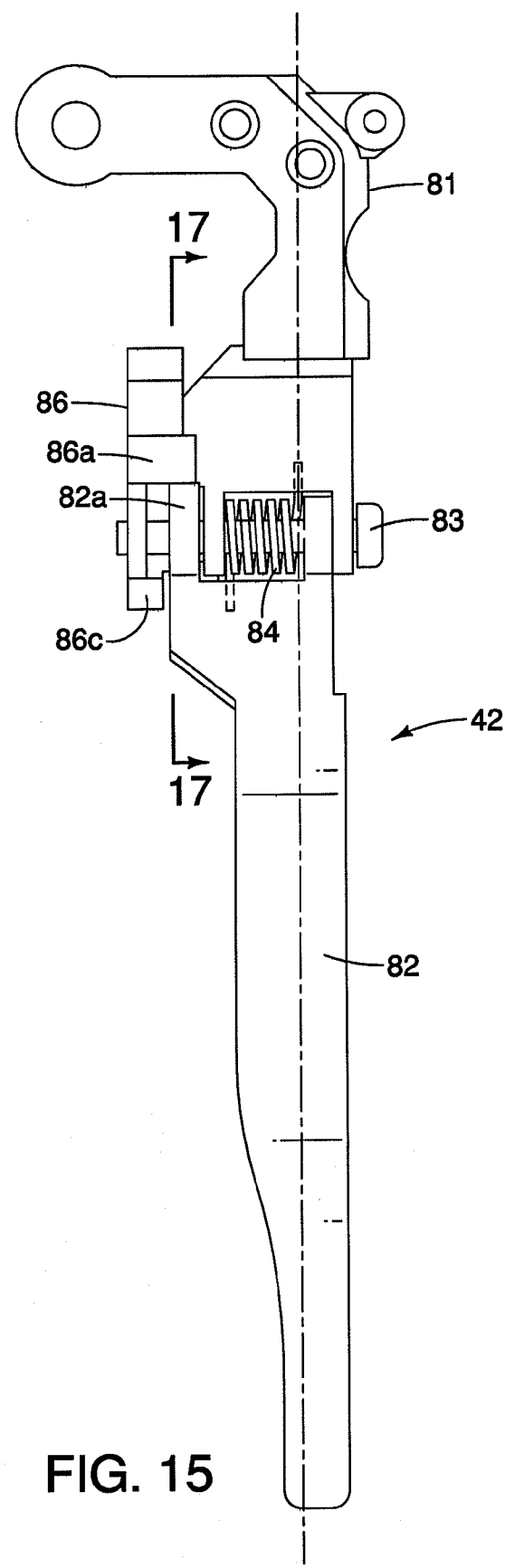
FIG. 15 is a front elevational view of the second shift operating lever of the left bicycle control (brake/shift) device.
Figure 16:
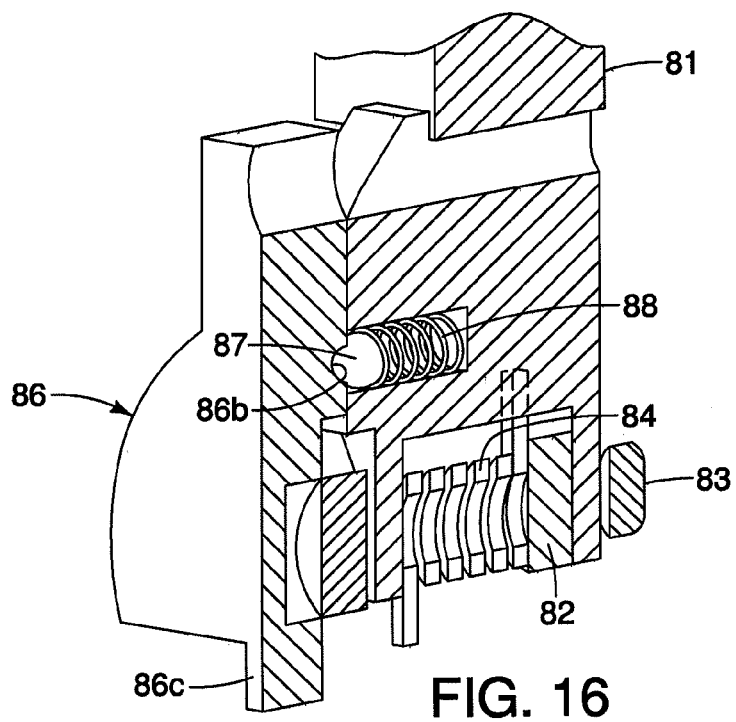
FIG. 16 is an enlarged partial cross sectional view of the second shift operating lever of the left bicycle control (brake/shift) device as seen along section line 16-16 of FIG. 13.
Figure 17:
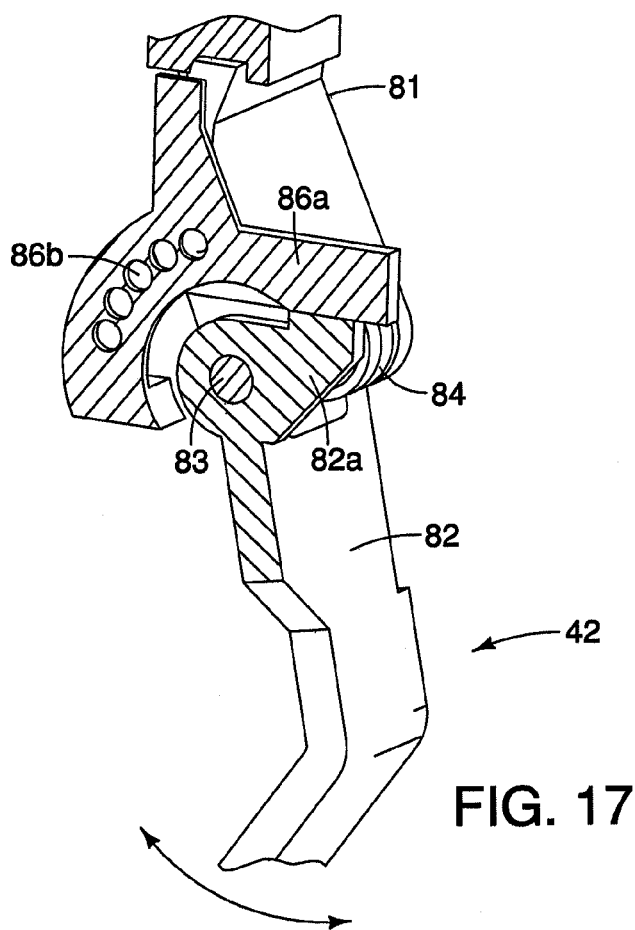
FIG. 17 is an enlarged partial cross sectional view of the second shift operating lever of the left bicycle control (brake/shift) device as seen along section line 17-17 of FIG. 15.
Figure 18:
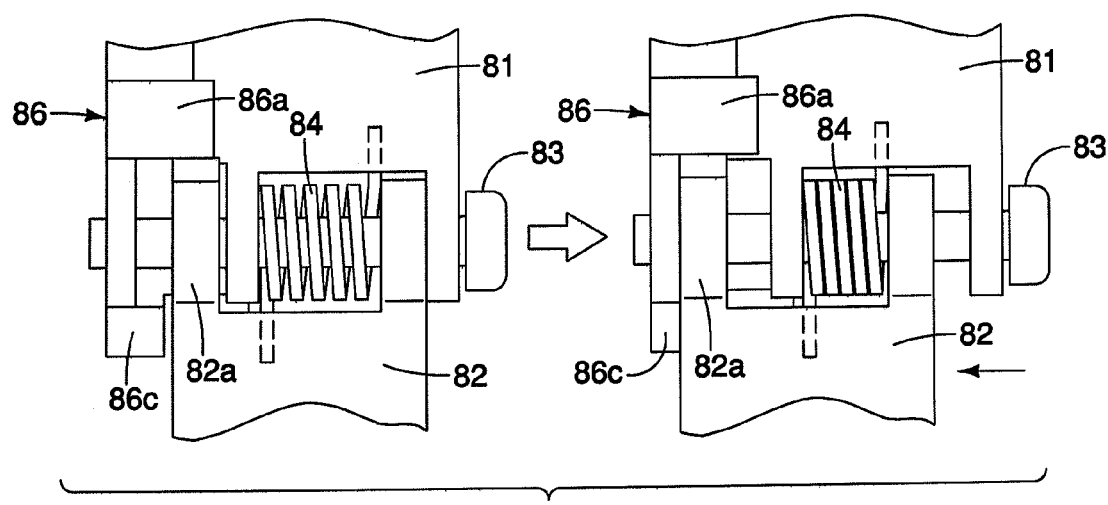
FIG. 18 is a pair of enlarged partial front elevational views of the second shift operating lever of the left bicycle control (brake/shift) device that illustrate a connecting movement to adjust the rest position of the second shift operating lever.
Figure 19:
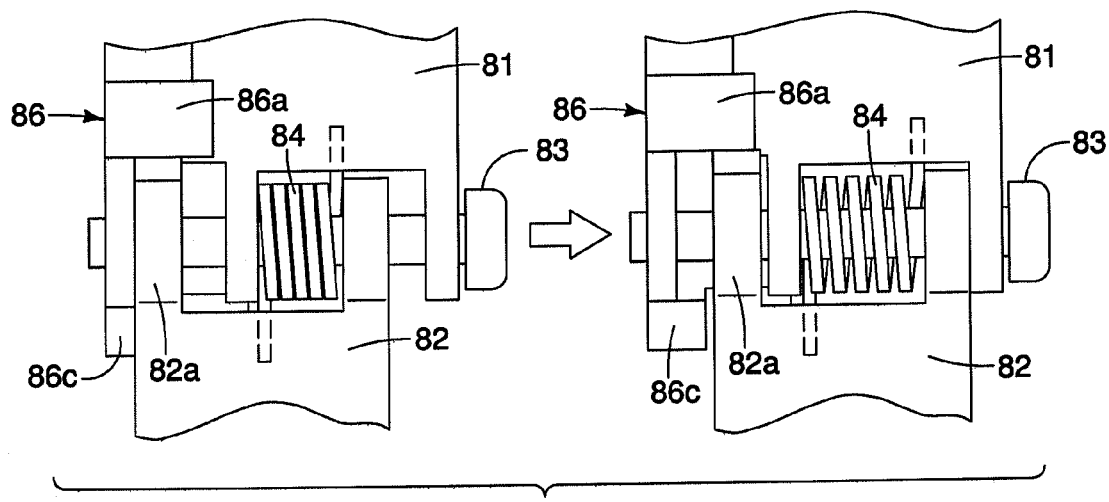
FIG. 19 is a pair of enlarged partial front elevational views of the second shift operating lever of the left bicycle control (brake/shift) device that illustrate a disconnecting movement to establish the adjusted rest position of the second shift operating lever.

In the illustrated embodiment, as seen in FIGS. 10 and 11, the shift control unit 38 is a cable operating device that includes a wire takeup member 51. The wire takeup member 51 is pivotally mounted on the shift unit axle 44, which defines a shift unit operating axis OA. The wire takeup member 51 is attached to the inner wire of the shift control cable 28 to pull and release the inner wire of the shift control cable 28 in response to operation of the first and second shift operating levers 41 and 42, respectively.

The first shift operating lever 41 is operatively coupled to the shift control unit 38 via the control member 40 to operate the shift control unit 38 (mainly, the wire takeup member 51) in a first operating direction D1 or a wire pulling direction about the shift unit axle 44 of the shift control unit 38. The second shift operating lever 42 is operatively coupled to the shift control unit 38 to operate the shift control unit 38 (mainly, the wire takeup member 51) in a second operating direction D2 or a wire releasing direction about the shift unit axle 44 of the shift control unit 38.

The first shift operating lever 41 preferably includes a mounting part 41a and an operating part 41b with the operating part 41b pivotally mounted to the mounting part 41a by a pivot pin 41c about a first shift operating axis SA. The mounting part 41a of the first shift operating lever 41 is also movably coupled relative to the base member 36 by a pivot pin 45 about a non-shift pivot axis or a brake lever pivot axis BA for performing the braking operation. Thus, the operating part 41b of the first shift operating lever 41 is movably coupled to mounting part 41a (i.e., relative to the base member 36) to move along a first shift operating plane or path P1 and movably coupled relative to the base member 36 to move along a non-shift (brake) movement plane or path BP that is non-coincident with the first shift operating plane or path P1. The operating part 41b is biased about the pivot pin 41c to a rest position with respect the first shift operating plane or path P1 by a biasing element 41d. As seen in FIG. 10, a ball and recess type positioning mechanism 41e is attached to the mounting part 41a to maintain the operating part 41b of the first operating lever 41 in the rest position. Also, as seen in FIG. 10, the first shift operating lever 41 includes a cable attachment structure 41f for attaching the brake control cable 32 thereto in a conventional manner.

The first shift operating lever 41 is operatively coupled to the shift control unit 38 via the control member 40 to operate the wire takeup member 51 of the shift control unit 38 in the first operating direction D1 as explained below. The first shift operating lever 41 is slidably engaged with the control member 40 such that the control member 40 is moved when the first shift operating lever 41 is moved along the non-shift (brake) movement path BP with sliding contact therebetween. Thus, when the first shift operating lever 41 is operated along the first shift operating plane or path P1, the control member 40 moves along a plane or path Pc. When the first shift operating lever 41 is operated along the non-shift (brake) movement path BP, the control member 40 moves along the non-shift (brake) movement path BP or a plane or path that is generally parallel to the non-shift (brake) movement plane or path BP.

The second shift operating lever 42 is operatively coupled to the shift control unit 38 to move along a second shift operating plane or path P2 to operate the wire takeup member 51 of the shift control unit 38 in the opposite (second) operating direction D2 from the first operating direction D1 due to operation of the first shift operating lever 41. The second shift operating lever 42 and the control member 40 pivot about a coincident pivot axis (i.e., the shift unit operating axis OA) when performing shifting operations as explained below.

Thus, the first and second shift operating levers 41 and 42 are coupled relative to the base member 36 to move along first and second shift operating planes P1 and P2, respectively, that intersect with the non-shift (brake) movement path BP (non-shift movement plane) of the first shift operating lever 41. The non-shift (brake) movement path BP (non-shift movement plane) of the first shift operating lever 41 is perpendicularly oriented with respect to the first and second shift operating planes or paths P1 and P2 of the first and second shift operating levers 41 and 42

Now referring to FIGS. 3 to 9, the movements of the first and second shift operating levers 41 and 42 will now be generally discussed with respect to the base member 36 that is configured to be fixedly mounted to the handlebar 16 by the handlebar mounting structure 43. In this illustrated embodiment, the first and second shift operating levers 41 and 42 are configured and arranged relative to each other such that they are aligned in the non-shift (brake) movement path BP to move in the non-shift (brake) movement path BP. In particular, the second shift operating lever 42 is located behind the first shift operating lever 41. The control member 40 contacts the rearward facing side of the first shift operating lever 41 and is located between the first and second shift operating levers 41 and 42. The first and second shift operating levers 41 and 42 are configured and arranged to pivot in a first rotational direction and a second rotational direction with respect to the base member 36 from the rest positions, respectively, with the first and second rotational directions being directions toward a central longitudinal plane of the bicycle 10.

Figure 8:
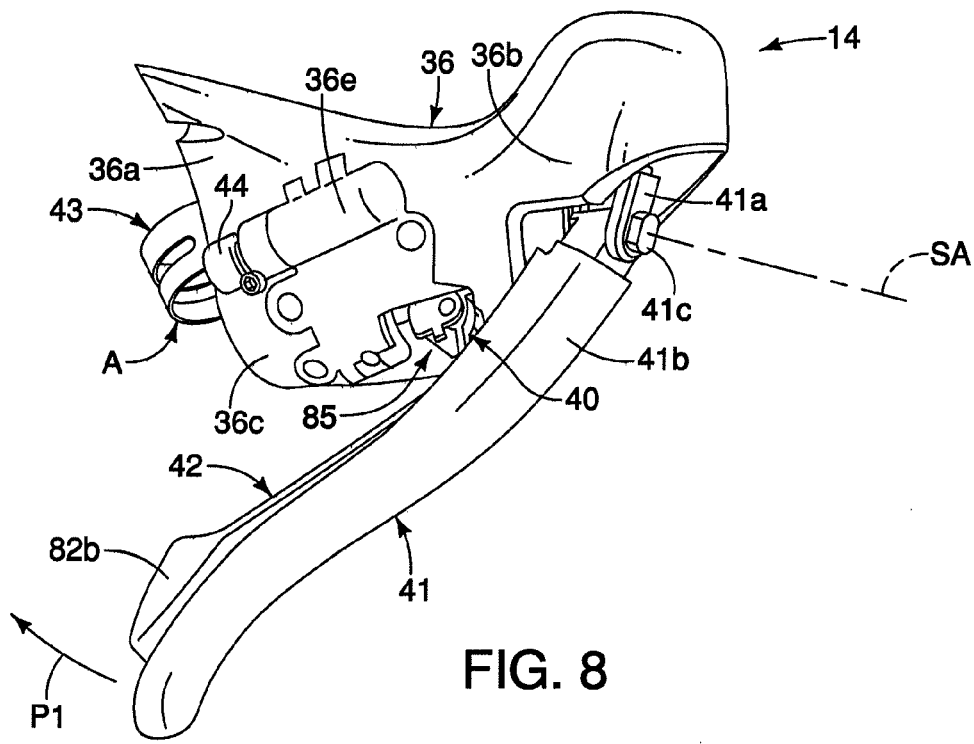
FIG. 8 is an inside elevational view of the left bicycle control (brake/shift) device with the first shift operating lever moved to a shifting position such that the second shift operating lever moves with the first shift operating lever.

As seen in FIGS. 4 and 8, in this illustrated embodiment, the first and second shift operating levers 41 and 42 are configured and arranged relative to each other such that the second shift operating lever 42 is moved by the first shift operating lever 41 when the first shift operating lever 41 is operated to move the wire takeup member 51 of shift control unit 38 in the first operating direction D1 about the shift unit axle 44 of the shift control unit 38. In other words, when a wire pulling operation is desired, the rider pushes the first shift operating lever 41 in a direction transverse to a center plane of the base member 36 along the first shift operating plane or path P1 from the first (rest) position (FIG. 4) to a second (shifting) position (FIG. 8) to operate the shift control unit 38. This movement of the first shift operating lever 41 operates the wire takeup member 51 of shift control unit 38 via the control member 40 in the first operating direction D1 which is a wire pilling operation in the illustrated embodiment. As mentioned above, the second shift operating lever 42 moves with the first shift operating lever 41 as the first shift operating lever 41 is moved from the first (rest) position to the second (shifting) position to operate the shift control unit 38.

Figure 6:
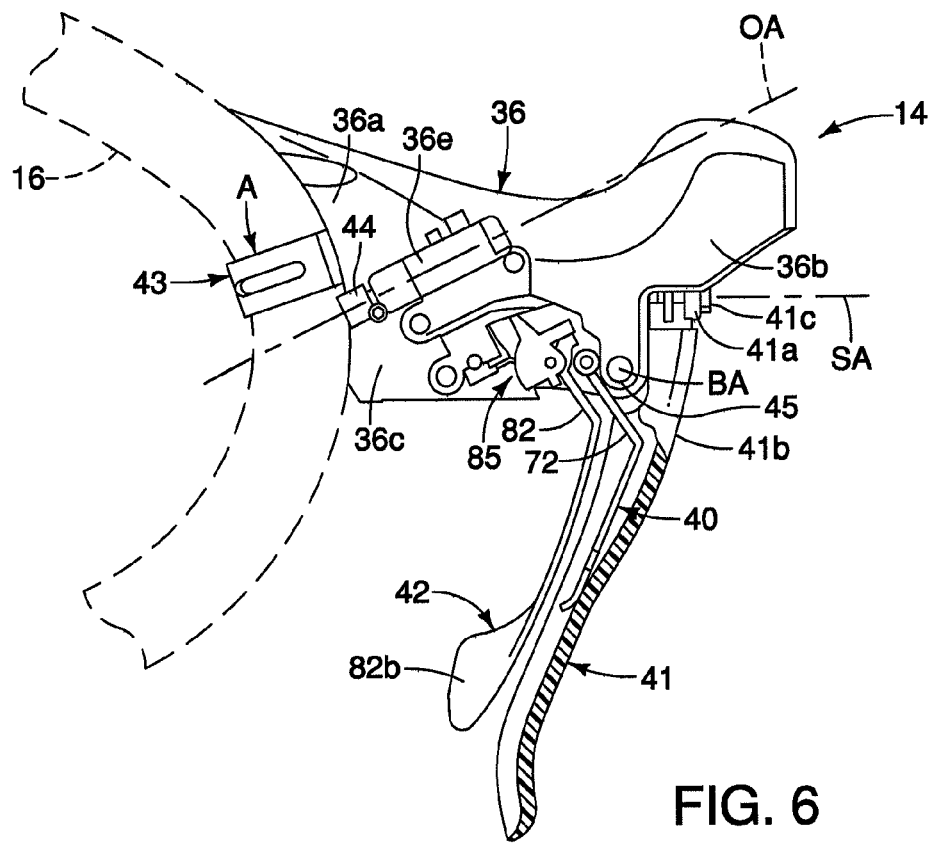
FIG. 6 is an inside elevational view of the left bicycle control (brake/shift) device with the first and second shift operating levers in the rest positions and a portion of the first shift operating lever broken away to illustrate the sliding connection between the first shift operating lever and the control lever.
Figure 7:
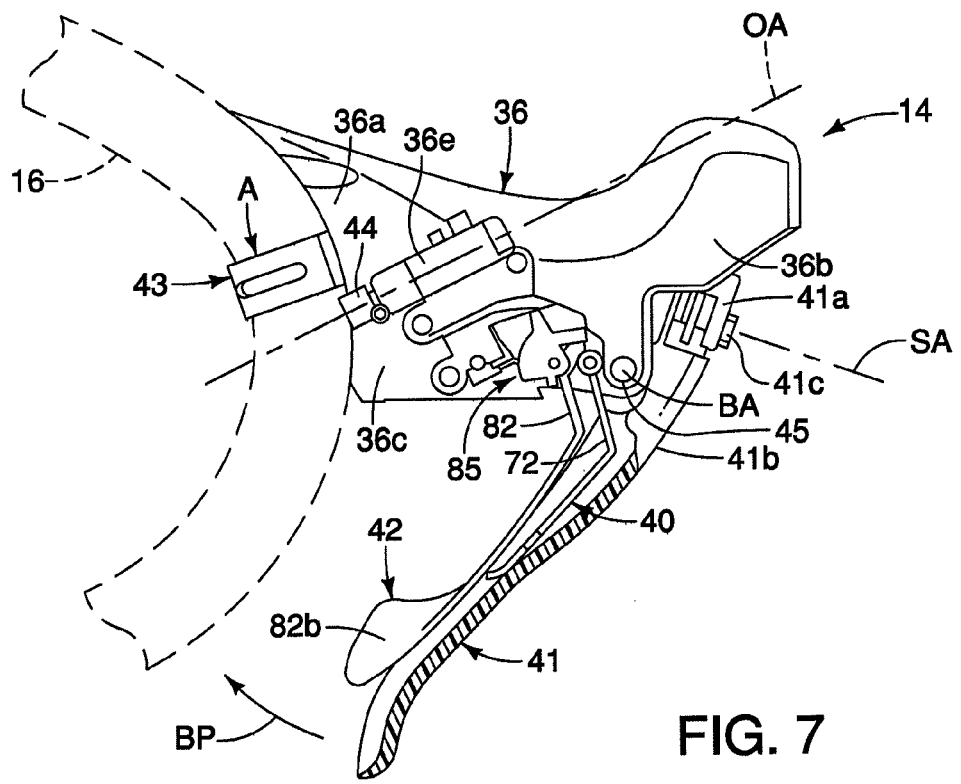
FIG. 7 is an inside elevational view, similar to FIG. 6, of the left bicycle control (brake/shift) device with the first and second shift operating levers, but with the first shift operating lever moved to a braking position such that the second shift operating lever moves with the first shift operating lever.

As seen in FIGS. 6 and 7, in the illustrated embodiment, the first shift operating lever 41 pivots about the pivot pin 45 between a first (rest) position (FIG. 6) and a second (braking) position (FIG. 7) along the non-shift (brake) movement path BP. The movement of the first shift operating lever 41 from the rest position to the braking position results in the first and second shift operating levers 41 and 42 also being pivoted along the non-shift (brake) movement plane BP as seen in FIG. 7.

Figure 9:
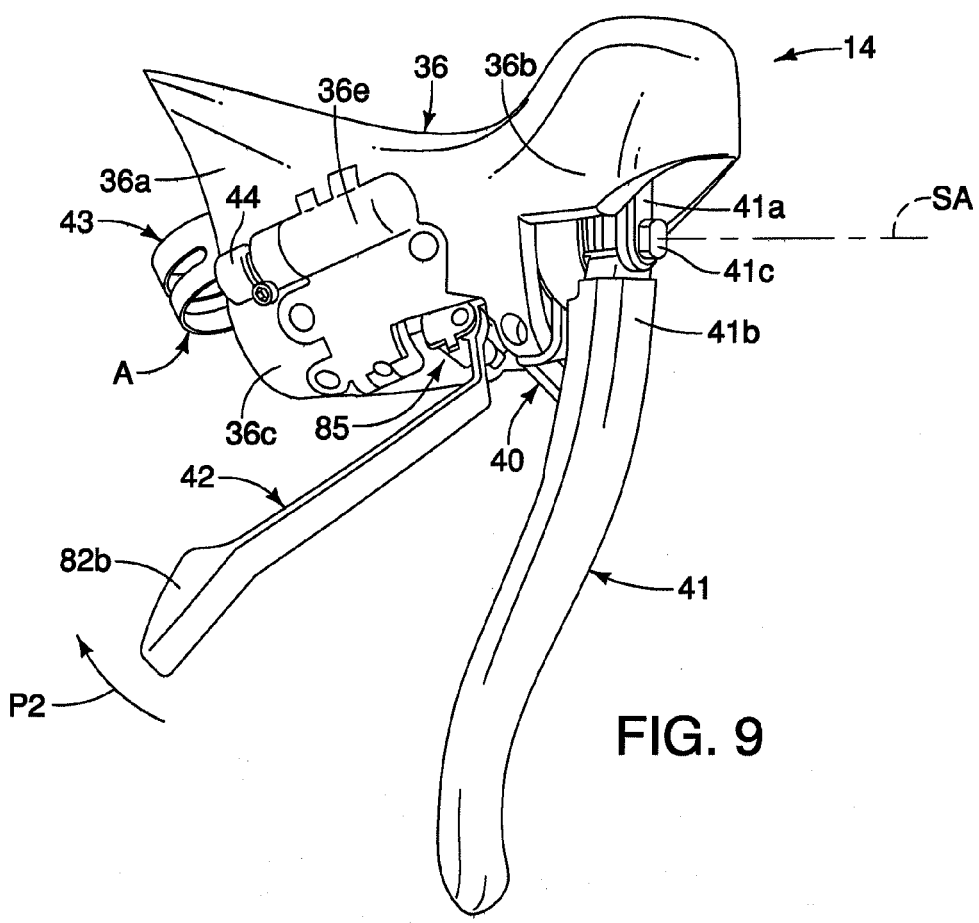
FIG. 9 is an inside perspective view of the left bicycle control (brake/shift) device with the second shift operating lever moved to a shifting position with the first shift operating lever remaining stationary.

As seen in FIGS. 4 and 9, in this illustrated embodiment, the first and second shift operating levers 41 and 42 are configured and arranged relative to each other such that the first shift operating lever 41 remains stationary when the second shift operating lever 42 is operated to move the wire takeup member 51 of shift control unit 38 in the second operating direction D2 about the shift unit axle 44 of the shift control unit 38. In other words, when a wire releasing operation is desired, the rider pushes the second shift operating lever 42 in a direction transverse to the center plane of the base member 36 along the second shift operating plane or path P2 from a first (rest) position to a second (shifting) position to operate the shift control unit 38. This movement of the second shift operating lever 42 operates the wire takeup member 51 of shift control unit 38 in the second operating direction D2 which is the wire releasing operation in the illustrated embodiment. As mentioned above, the second shift operating lever 42 moves independently with respect to the first shift operating lever 41 as the second shift operating lever 42 is moved from the first (rest) position to the second (shifting) position to operate the shift control unit 38.

Thus, the second shift operating lever 42 is a separate operating member from the first shift operating lever 41 and the second shift operating lever 42 can move independently of the first shift operating lever 41.

Referring now to FIGS. 10 and 11, the shift control unit 38 will now be discussed in more detail. The shift control unit 38 is mounted to the base member 36 by the shift unit axle 44. The shift control unit 38 is basically operated by the first and second shift operating levers 41 and 42 to pull or release the inner wire of the shift control cable 28. The shift control unit 38 is mounted to the base member 36 by the shift unit axle 44 as mentioned above.

In addition to the wire takeup member 51, mentioned above, the shift control unit 38 further includes a wire pulling pawl 52, a positioning plate or member 53, a positioning pawl 54, a release plate or member 55 and a release pawl 56. The wire takeup member 51, the positioning plate 53 and the release plate 55 are all rotatably mounted on the shift unit axle 44. In other words, the shift unit axle 44 forms the main pivot or operating axis OA of the shift control unit 38 with the wire takeup member 51, the positioning plate 53, the release plate 55 and the second shift operating lever 42 and the control member 40 being pivotally mounted about the main pivot or operating axis OA of the shift control unit 38. The wire takeup member 51 and the positioning plate 53 are fixed together as an integrated unit so as to rotate together. The release plate 55 can rotate independently of the wire takeup member 51 and the positioning plate 53. The wire pulling pawl 52 is pivotally mounted on the control member 40 so as to move with the first shift operating lever 41, when the first shift operating lever 41 is moved along the first shift operating plane P1. The release pawl 56 is pivotally mounted on the second shift operating lever 42 so as to move with the second shift operating lever 42, when the second shift operating lever 42 is moved along the second shift operating plane P2.

A return spring or biasing element 58 is preferably operatively coupled between the wire takeup member 51 and the base member 36 to urge the wire takeup member 51 and the positioning plate 53 in the wire releasing direction D2 about the shift unit axle 44. In the illustrated embodiment, the return spring or biasing element 58 is a compression spring with one end contacting the wire takeup member 51 and the other end contacting the base member 36, as seen in FIGS. 10 and 11. The wire takeup member 51 is also at least partially urged by a cable tension due to, for example, a pull force from the front derailleur 26.

A return spring or biasing element 59 is preferably operatively coupled between the second shift operating lever 42 and a mounting member 60 that is attached to the base member 36. In the illustrated embodiment, the return spring or biasing element 59 is a tension spring with one end fixed to the second shift operating lever 42 and the other end fixed to the mounting member 60. The return spring or biasing element 59 applies an urging force to the second shift operating lever 42 to bias the second shift operating lever 42 to the rest position. Since the second shift operating lever 42 abuts against the control member 40 that is held in its rest position by the positioning mechanism 41e, the second shift operating lever 42 stays in the rest position.

As mentioned above, the first shift operating lever 41 is configured and arranged relative to the wire takeup member 51 such that the first shift operating lever 41 performs the wire pulling operation of the wire takeup member 51 when the first shift operating lever 41 is operated. The second shift operating lever 42 is configured and arranged relative to the wire takeup member 51 such that the second shift operating lever 42 performs the wire releasing operation of the wire takeup member 51 when the second shift operating lever 42 is operated.

The wire takeup member 51 is a fan shaped member that is pivotally mounted relative to the base member 36 about the pivot or operating axis OA of the shift control unit 38. The wire takeup member 51 is fixed to the positioning plate 53 so that the wire takeup member 51 and the positioning plate 53 move together relative to the base member 36. The wire takeup member 51 has a proximal end portion 51a pivotally mounted on the shift unit axle 44 and a distal end portion 51b for pulling and releasing the inner wire of the cable 28. The proximal end portion 51a of the wire takeup member 51 is preferably narrower than the distal end portion 51b of the wire takeup member 51. However, other shapes of the wire takeup member 51 are possible without departing from the present invention.

The distal end portion 51b of the wire takeup member 51 has a peripheral edge with an inner wire attachment structure or point 51c and a wire receiving groove 51d. Thus, the wire takeup member 51 pulls and releases the inner wire of the control cable 28 on the peripheral edge of the distal end portion 51b.

The wire pulling pawl 52 is pivotally mounted to the control (wire pulling) member 40, which in turn is pivotally mounted to the shift unit axle 44. The wire pulling pawl 52 is further pivotally arranged to engage the positioning plate 53 when the first shift operating lever 41 is moved from the rest position to the shifting position. The wire pulling pawl 52 is further pivotally arranged to be selectively disengaged from the positioning plate 53 in response to movement of the release plate 55 when the second shift operating lever 42 is moved from the rest position to the shifting position. The wire pulling pawl 52 is normally urged towards engagement with the positioning plate 53 by a biasing member 61. In this illustrated embodiment, the biasing member 61 is a torsion spring that is mounted on a pivot pin 62 which in turn attaches the wire pulling pawl 52 to the control (wire pulling) member 40.

The positioning plate 53 is fixedly coupled to the wire takeup member 51 so as to rotate together. The positioning plate 53 is pivotally mounted relative to the base member 36 about the main pivot or operating axis OA of the shift unit axle 44. In particular, the positioning plate 53 is a fan shaped member that has a narrow proximal end at the main pivot or operating axis OA of the shift unit axle 44 and a wide distal end. The wide distal end of the positioning plate 53 includes a plurality (three) of winding teeth or abutments 53a that are selectively engaged by the wire pulling pawl 52, and a plurality (two) of positioning teeth or abutments 53b that are selectively engaged by the positioning pawl 54. When the first shift operating lever 41 is moved from the first (rest) position to the second (shifting) position to operate the shift control unit 38, the wire pulling pawl 52 engages one of the winding abutments 53a of the positioning plate 53 to rotate the wire takeup member 51 in the wire pulling direction.

The positioning pawl 54 is pivotally mounted on a pivot pin 63, which is The positioning pawl 54 is pivotally mounted on a pivot pin 63, which is fixedly supported by the main body of the base member 36. The positioning pawl 54 is normally urged towards engagement with the positioning abutments 53b of the positioning plate 53 by a biasing member 64. In this illustrated embodiment, the biasing member 64 is a torsion spring that is mounted on the pivot pin 63 which in turn attach the positioning pawl 54 to the base member 36. Thus, positioning pawl 54 is pivotally mounted about a positioning pawl pivot axis of the pivot pin 63 to operatively engage the abutments 53b of the positioning plate 53. In other words, the positioning abutments 53b are selectively engaged by the positioning pawl 54 to maintain the positioning plate 53 and the wire takeup member 51 in one of a plurality of predetermined shift positions. When the first shift operating lever 41 is moved from the first (rest) position to the second (shifting) position to operate the shift control unit 38, the positioning pawl 54 moves momentarily out of holding engagement with the positioning abutments 53b of the positioning plate 53 in response to movement of the release plate 55.

The release plate 55 cooperates with the positioning pawl 54 to release the wire takeup member 51 so that the wire takeup member 51 rotates in the wire releasing direction D2 due to the urging force of the return spring or biasing element 58 and a cable tension due to, for example, a pull force from the front derailleur 26. The release plate 55 is pivotally mounted relative to the base member 36 about the main pivot or operating axis OA of the shift unit axle 44. The release plate 55 and the positioning pawl 54 are configured and arranged relative to each other such that the positioning pawl 54 is moved by the release plate 55 from a retaining position that retains the positioning plate 53 in a shift position to a releasing position that releases the positioning plate 53 in response to movement of the release plate 55. Also the release plate 55 and the wire pulling pawl 52 are configured and arranged relative to each other such that the wire pulling pawl 52 is moved with respect to the positioning plate 53 in response to movement of the release plate 55 by the second shift operating lever 42.

The release plate 55 is a fan shaped member that has a narrow proximal end at the main pivot or operating axis OA of the shift unit axle 44 and a wide distal end. In particular, the wide distal end of the release plate 55 includes a driving abutment 55a and a plurality (two) of release teeth or abutments 55b. The driving abutments 55a is selectively engaged by the release pawl 56 in response to initial movement of the second shift operating lever 42 from the rest position towards the shifting position. Upon rotation of the release plate 55, the release abutments 55b selectively engage the wire pulling pawl 52 and the positioning pawl 54 to move (pivot) them out of engagement with the winding abutments 53a and the positioning abutments 53b, respectively. Basically, the release plate 55 remains stationary when the first shift operating lever 41 is operated and moves when the second shift operating lever 42 is operated. A biasing member 65 is provided on the shift unit axle 44 to urge the release plate 55 towards the rest position in the second operating direction D2. In this illustrated embodiment, the biasing member 65 is a torsion spring with the coiled portion mounted on the shift unit axle 44, a first end engaging the release plate 55 and a second end engaging a part of the base member 36.

The release pawl 56 is movably (pivotally) mounted on the second shift operating lever 42 by a pivot pin (not shown), which is fixed to the second shift operating lever 42 so as to attach the release pawl 56 to the second shift operating lever 42. In particular, the release pawl 56 is movable from a rest position in a direction away from the main pivot or operating axis OA of the shift unit axle 44 to a release operating position. Normally, the release pawl 56 rest on an abutment 40a of the control (wire pulling) member 40 such that when the first shift operating lever 41 is operated, the release pawl 56 does not engage the driving abutment 55a. However, when the second shift operating lever 42 is operated, the release pawl 56 moves off of the abutment 40a of the control (wire pulling) member 40 and moves towards engagement with the driving abutment 55a of the release plate 55. The release pawl 56 is urged in a counterclockwise direction about the pivot pin (not shown) by a biasing member (not shown) in the form of a torsion spring provided with a coiled portion mounted on the pivot pin (not shown), a first end engaged with the release pawl 56 and a second end engaged with the second shift operating lever 42. When the second shift operating lever 42 is moved from the first (rest) position to the second (shifting) position to operate the shift control unit 38, the release plate 55 is rotated so that the release abutments 55b selectively engage the wire pulling pawl 52 and the positioning pawl 54 to release the positioning plate 53 when the release plate 55 is rotated in the first operating direction D1. Thus, the release plate 55 releases the wire takeup member 51 to rotates in the wire releasing direction D2 due to the urging force of the return spring or biasing element 58 and the cable tension in response to movement of the second shift operating lever 42.

The control (wire pulling) member 40 is pivotally mounted to the shift unit axle 44 to move along the operating plane Pc as mentioned above. The operating plane Pc intersects with the non-shift (brake) movement plane or path BP of the first shift operating lever 41 and is parallel with the second shift operating plane P2. The control (wire pulling) member 40 is located behind the first shift operating lever 41 and the control (wire pulling) member 40 is located in front of the second shift operating lever 42, when the first and second shift operating levers 41 and 42 are in rest positions.

Preferably, the control (wire pulling) member 40 basically includes a first lever portion 71 operatively coupled to the shift control unit 38 and a second lever portion 72 spaced from the first lever portion 71. The first lever portion 71 is operatively coupled to the shift control unit 38. In particular, the first lever portion 71 of the control member 40 is pivotally connected to the shift control unit 38 about the main pivot or operating axis OA of the shift unit axle 44 to operate the shift control unit 38 when the first shift operating lever 41 is operated along the first shift operating plane or path P1. The second lever portion 72 is spaced from the first lever portion 71 and contacts the rear surface of the first shift operating lever 41. Thus, the first shift operating lever 41 is slidably engaged with the second lever portion 72 of the control member 40 such that the second lever portion 72 of the control member 40 is moved when the first shift operating lever 41 is moved along the non-shift movement path BP with sliding contact therebetween. During movement of the first shift operating lever 41 along the first shift operating plane or path P1, the control (wire pulling) member 40 is moved relative to the base member 36 to move the positioning plate 53 via the wire pulling pawl 52 to perform a wire pulling operation.

A hinge pin 73 pivotally interconnects the first and second lever portions 71 and 72 together. A biasing element 74 is mounted on the hinge pin 73 to urge the second lever portion 72 forwardly with respect to the first lever portion 71 to a rest position. This intermediate hinge between the first and second lever portions 71 and 72 allows the second lever portion 72 to pivot rearwardly with respect to the first lever portion 71 such as when the first shift operating lever 41 is operated from the rest (non-braking) position to the braking position as seen in FIGS. 6 and 7. In other words, the control member 40 includes an intermediate hinge such that the second lever portion 72 of the control member 40 is pivoted in non-operating direction when the first shift operating lever 41 is operated along the non-shift movement path BP.

The first lever portion 71 of the control member 40 has an abutment 71a (side surface) for moving the second shift operating lever 42 when the first shift operating lever 41 is operated. When the wire pulling operation is desired, the rider pushes the first shift operating lever 41 in a direction transverse to the non-shift (brake) movement plane or path BP of the first shift operating lever 41 along the first shift operating plane or path P1 from the first (rest) position to the second (shifting) position. This movement of the first shift operating lever 41 causes the control member 40 to move therewith to operate the shift control unit 38.

The second shift operating lever 42 is pivotally mounted to the shift unit axle 44 to move along the second shift operating plane or path P2. The second shift operating plane P2 intersects with the non-shift (brake) movement plane or path BP of the first shift operating lever 41. The second shift operating lever 42 and the control member 40 pivot about a coincident pivot axis of the shift unit axle 44 when performing shifting operations. The second shift operating lever 42 is located behind the first shift operating lever 41, when the first and second shift operating levers 41 and 42 are in rest positions. The second shift operating lever 42 is operatively arranged to rotate the positioning plate 53 about the main pivot or operating axis OA of the shift unit axle 44 in the second operating direction D2 via movement of the release plate 55 by the operation of the second shift operating lever 42.

In particular, the second shift operating lever 42 basically includes a first lever portion 81 operatively coupled to the shift control unit 38 and a second lever portion 82 spaced from the first lever portion 81. A hinge pin 83 pivotally interconnects the first and second lever portions 81 and 82 together. A biasing member 84 is mounted on the hinge pin 83 to urge the second lever portion 82 forwardly with respect to the first lever portion 81 to a rest position. The biasing member 84 acts as both a torsion spring and a compression spring as explained below. This hinge between the first and second lever portions 81 and 82 allows the second lever portion 82 to pivot rearwardly with respect to the first lever portion 81 such as when the first shift operating lever 41 is operated from the rest (non-braking) position to the braking position as seen in FIGS. 6 and 7. In other words, the second shift operating lever 42 includes an intermediate hinge such that the second lever portion 82 of the second shift operating lever 42 is pivoted in a non-operating direction when the first shift operating lever 41 is operated along the non-shift movement path BP.

Preferably, as best seen in FIGS. 12 to 19, the second shift operating lever 42 is further provided with a lever adjustment mechanism 85. The biasing member 84 is part of the lever adjustment mechanism 85 as explained below. The lever adjustment mechanism 85 is operatively coupled to the second shift operating lever 42 to change a location of the rest position of the second shift operating lever 42 along the non-shift movement path BP. In particular, the lever adjustment mechanism 85 adjusts a relative position between the first and second lever portions 81 and 82 to change the location of the rest position of the second shift operating lever 42.

In addition to the biasing member 84, mentioned above, the lever adjustment mechanism 85 further includes a lever adjustment member 86, a retaining ball 87 and a compression spring 88. The lever adjustment member 86 is pivotally mounted on one end of the hinge pin 83. The second lever portion 82 of the second shift operating lever 42 has an abutment 82a (flange) contacts the lever adjustment member 86 to establish the rest position of the second lever portion 82 of the second shift operating lever 42 in the non-shift movement path BP. The lever adjustment member 86 has an abutment surface 86a to contact the abutment 82a of the second lever portion 82 such that the abutment surface 86a prevents the second lever portion 82 from rotating in a first direction about the hinge pin 83 of the intermediate hinge. The lever adjustment member 86 also has a plurality of recesses 86b that are selectively engaged by the retaining ball 87. The recesses 86b cooperate with the retaining ball 87 to form a detent-and-recess arrangement between the lever adjustment member 86 and the first lever portion 81 of the second shift operating lever 42. The lever adjustment member 86 also has an abutment 86c that engages the second lever portion 82 so that the lever adjustment member 86 and the second lever portion 82 move together during adjustment of the rest position.

The second lever portion 82 is slidable along the hinge pin 83 in an axial direction of the hinge pin 83 between a rest (first) position and an adjustment (second) position. The biasing member 84 urges the second lever portion 82 both in an axial direction and a rotational about the hinge pin 83 to the rest position. In the rest (first) position, the second lever portion 82 is movable along the non-shift movement path BP from the rest position while the lever adjustment member 86 remains stationary. In the adjustment (second) position, the second lever portion 82 and the lever adjustment member 86 are configured to move together along the non-shift movement path BP. In particular, when the second lever portion 82 is moved to the adjustment (second) position, the second lever portion 82 then contacts the abutment 86c of the lever adjustment member 86 so that the lever adjustment member 86 and the second lever portion 82 move together during adjustment of the rest position.

The abutment 82a (flange) also contacts the abutment 71a of the control member 40 such that the second shift operating lever 42 moves with the first shift operating lever 41 when the first shift operating lever 41 is operated. Thus, the abutments 71a and 82a are configured and arranged relative to each other such that the second shift operating lever 42 is moved by the first shift operating lever 41. The second lever portion 82 of the second shift operating lever 42 has a finger contact portion 82b located at the end opposite the hinge for moving the second shift operating lever 42 about the shift unit axle 44 of the shift control unit 38. When the wire releasing operation is desired, the rider pushes the finger contact portion 82b of the second shift operating lever 42 in a direction transverse to the non-shift (brake) movement plane or path BP of the first shift operating lever 41 along the second shift operating plane or path P2 from the first (rest) position to a second (shifting) position to operate the shift control unit 38.

In the above discussed embodiment, the shift control unit 38 is illustrated as a cable operating shift control unit, which is merely one example of a shift control unit that can be used with the bicycle control device 12. In other words, the shift control unit for the bicycle control device 12 is not limited to a cable operating system, but rather other types of shift control units can be used with the bicycle control device 12 described and illustrated herein. For example, the shift control unit 38 can be replaced an electrical shift control unit, or a pneumatic shift control unit, or hydraulic shift control unit. In the case of an electrical shift control unit, at least a pair of electrical switches would be provided for performing upshift and downshift operations in response to selective movements of the first and second shift operating levers 41 and 42. In the case of a pneumatic shift control unit or hydraulic shift control unit, a valve system would be provided for performing upshift and downshift operations in response to selective movements of the first and second shift operating levers 41 and 42.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
    abuse member having a handlebar mounting structure that secures the bicycle control device to a bicycle handlebar;
    a shift control unit mounted to the base member;
    a brake lever movably mounted relative to the base member;
    a shift operating lever operatively coupled to the shift control unit to operate the shift control unit when the shift operating lever is moved from a rest position along a shift operating path, the shift operating lever including a rider contact portion that is pivotally mounted about a pivot axis of an intermediate hinge to move from the rest position along a non-shift movement path independently of the brake lever, and the shift operating lever being positioned behind the brake lever and pivoting about the pivot axis of the intermediate hinge in response to movement of the brake lever such that a center of pivot of the shift operating lever is the pivot axis of the intermediate hinge; and
    a lever adjustment mechanism operatively coupled to the shift operating lever to change a location of the rest position of the rider contact portion of the shift operating lever along the non-shift movement path, the lever adjustment mechanism having a lever adjustment member pivotally mounted directly on and contacting the intermediate hinge between a plurality of different adjustment positions with the rest position of the rider contact portion being changed in accordance with the adjustment positions of the lever adjustment member, with the pivot axis of the intermediate hinge being coincident with a pivot axis of the lever adjustment member, the pivot axis of the lever adjustment member being a center of pivot of the lever adjustment member between the plurality of different adjustment positions,
    the pivot axis of the intermediate hinge remaining in a fixed orientation with respect to the base member between the different adjustment positions, and
    the lever adjustment member being movably arranged with respect to the base member between the different adjustment positions with the handlebar mounting structure in a fully installed position on the bicycle handlebar such that the base member remains securely fixed to the bicycle handlebar during adjustment between the different adjustment positions.

2. The bicycle control device according to claim 1, wherein the shift operating lever includes a first lever portion operatively coupled to the shift control unit and a second lever portion that includes the rider contact portion with the intermediate hinge located between the first and second lever portions; and
    the lever adjustment mechanism adjusts a relative position between the first and second lever portions to change the location of the rest position of the rider contact portion of the shift operating lever.

3. The bicycle control device according to claim 2, wherein the lever adjustment member has an abutment surface to contact the second lever portion such that the abutment surface prevents the second lever portion from rotating in a first direction about the intermediate hinge.

4. The bicycle control device according to claim 3, wherein the lever adjustment mechanism further includes a detent-and-recess arrangement between the lever adjustment member and the first lever portion of the shift operating lever.

5. A bicycle control device comprising:
    a base member;
    a shift control unit mounted to the base member;
    a brake lever movably mounted relative to the base member;
    a shift operating lever operatively coupled to the shift control unit to operate the shift control unit when the shift operating lever is moved from a rest position along a shift operating path, the shift operating lever being movable from the rest position along a non-shift movement path independently of the brake lever, the shift operating lever including a first lever portion and a second lever portion with an intermediate hinge located between the first and second lever portions; and
    a lever adjustment mechanism operatively coupled to the shift operating lever to change a location of the rest position of the shift operating lever along the non-shift movement path by adjusting a relative position between the first and second lever portions, the lever adjustment mechanism including a lever adjustment member having an abutment surface to contact the second lever portion such that the abutment surface prevents the second lever portion from rotating in a first direction about the intermediate hinge,
    the intermediate hinge including a hinge pin with the second lever portion being slidable in an axial direction of the hinge pin between a first position in which the second lever portion is movable in a second direction opposite the first direction along the non-shift movement path from the rest position while the lever adjustment member remains stationary and a second position in which the second lever portion and the lever adjustment member are configured to move together along the non-shift movement path.

6. The bicycle control device according to claim 5, wherein the lever adjustment mechanism includes a biasing member that urges the second lever portion to the first position.

7. The bicycle control device according to claim 6, wherein the biasing member further urges the second lever portion in the first direction about the hinge pin.

8. The bicycle control device according to claim 1, wherein the brake lever is operatively coupled to the shift control unit to operate the shift control unit in an opposite shifting direction from a shifting direction due to operation of the shift operating lever.

9. The bicycle control device according to claim 1, wherein the base member includes a main body with the handlebar mounting structure at a first end section of the main body, with the shift operating lever being pivoted along the non-shift movement path towards the handlebar mounting structure.

10. The bicycle control device according to claim 1, wherein the pivot axis of the intermediate hinge remains stationary with respect to the rider contact portion as the rest position of the rider contact portion is changed in accordance with the different adjustment positions of the lever adjustment member.

11. The bicycle control device according to claim 5, wherein the hinge pin has a pivot axis that remains stationary with respect to the first and second lever portions as the rest position of the shift operating lever is changed by the lever adjustment mechanism.

12. The bicycle control device according to claim 5, wherein the shift operating lever is positioned behind the brake lever and moves in response to movement of the brake lever.

13. The bicycle control device according to claim 1, wherein the shift operating lever is biased to the rest position such that the shift operating lever returns to the rest position after a brake operation has been performed, the shift operating lever moving with the brake lever during the brake operation from the rest position.

14. The bicycle control device according to claim 3, wherein the abutment surface prevents the second lever from rotating in only the first direction about the intermediate hinge, such that the abutment surface permits the second lever portion to rotate about the intermediate hinge in a second direction which is opposite the first direction.

15. The bicycle control device according to claim 3, wherein the abutment surface is spaced from the intermediate hinge.

* * * * *